US008690723B2

(12) United States Patent
Dilzer et al.

(10) Patent No.: US 8,690,723 B2
(45) Date of Patent: Apr. 8, 2014

(54) METHOD FOR CONTROLLING A SHIFTABLE PLANETARY GEAR SET IN A BELT PULLEY PLANE OF A DRIVETRAIN

(71) Applicant: Schaeffler Technologies AG & Co. KG, Herzogenaurach (DE)

(72) Inventors: Martin Dilzer, Buehl (DE); Dierk Reitz, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/925,160

(22) Filed: Jun. 24, 2013

(65) Prior Publication Data

US 2013/0281254 A1 Oct. 24, 2013

Related U.S. Application Data

(63) Continuation of application No. PCT/DE2011/002076, filed on Dec. 5, 2011.

(30) Foreign Application Priority Data

Dec. 24, 2010 (DE) .......................... 10 2010 056 164
Jan. 26, 2011 (DE) .......................... 10 2011 009 465

(51) Int. Cl.
*F16H 3/44* (2006.01)
(52) U.S. Cl.
USPC .......................................................... 475/318
(58) Field of Classification Search
USPC .................................................. 475/317, 318
See application file for complete search history.

(56) References Cited

U.S. PATENT DOCUMENTS

| 6,668,953 | B1 * | 12/2003 | Reik et al. | 180/53.8 |
| 8,029,403 | B2 * | 10/2011 | Lee et al. | 475/276 |
| 8,152,669 | B2 * | 4/2012 | Maguire et al. | 475/5 |
| 2004/0043859 | A1 * | 3/2004 | Yurgil et al. | 475/318 |

FOREIGN PATENT DOCUMENTS

| CA | 1252648 | 4/1989 |
| DE | 3508808 | 9/1985 |
| DE | 102004060991 | 8/2005 |
| DE | 102007021233 | 11/2007 |
| DE | 102006037577 | 2/2008 |
| WO | 0177520 | 10/2001 |

* cited by examiner

*Primary Examiner* — Edwin A Young
(74) *Attorney, Agent, or Firm* — Simpson & Simpson, PLLC

(57) ABSTRACT

A method for controlling a belt drive of a drivetrain of a motor vehicle, with a planetary gear set which shifts a transmission ratio between a starter-generator and a combustion engine, the planetary gear set having a ring gear which can be connected fixedly with respect to a housing by a brake, a web which is connectible to a crankshaft of the combustion engine of the drivetrain, having planet gears arranged around the circumference, and a sun gear which is connected in a rotationally fixed connection to a rotor of the starter-generator and to at least one ancillary unit, as well as having a first switchable free-wheeling mechanism which blocks in the direction of torque from the rotor to the crankshaft and having a second switchable free-wheeling mechanism which blocks in the direction of torque from the crankshaft to the rotor.

13 Claims, 2 Drawing Sheets

METHOD FOR CONTROLLING A SHIFTABLE PLANETARY GEAR SET IN A BELT PULLEY PLANE OF A DRIVETRAIN

CROSS-REFERENCE TO RELATED APPLICATIONS

This application is a continuation of International Patent Application No. PCT/DE2011/002076 filed on Dec. 5, 2011 which claims priority of German Patent Application No. 10 2010 056 164.9 filed on Dec. 24, 2010 and German Patent Application No. 10 2011 009 465.2 filed on Jan. 26, 2011, which applications are incorporated herein by reference in their entireties.

FIELD OF THE INVENTION

The invention relates to a method for controlling a belt drive of a drivetrain of a motor vehicle, with a planetary gear set which shifts a transmission ratio between a starter-generator and a combustion engine, the planetary gear set having a ring gear which can be connected fixedly with respect to a housing by a brake, a web which is connectible to a crankshaft of the combustion engine of the drivetrain, having planet gears arranged around the circumference, and a sun gear which is connected in a rotationally fixed connection to a rotor of the starter-generator and to at least one ancillary unit, as well as having a first switchable free-wheeling mechanism which blocks in the direction of torque from the rotor to the crankshaft and having a second switchable free-wheeling mechanism which blocks in the direction of torque from the crankshaft to the rotor.

BACKGROUND OF THE INVENTION

Belt drives in a power train of a motor vehicle, in particular, in a pulley plane of a combustion engine opposite the transmission side, have long been known. In this case, the crankshaft drives ancillary units by way of the belt drive, for example, an electric generator, an air conditioner compressor, oil and/or water pumps and the like. To be able to design a so-called starter-generator, to be utilized as an electric generator and a starter motor, in terms of its size and performance for both functions, belt drives with planetary gear sets are proposed in German Patent Application No. 10 2004 060 991 and German Patent Application No. 10 2007 021 233 which set different transmission ratios depending on the flow of torque between the rotor of the starter-generator and the crankshaft of the combustion engine. For example, during the process of starting the combustion engine, the speed of the starter-generator is translated to a lower speed in order to attain a necessary angular momentum for an impulse start, while in generator mode little or no transmission ratio translation is provided between rotor and crankshaft.

The shifting of the transmission ratios and of the flow of torque is accomplished by means of one or more actuators, where on the one hand the gear ratio is achieved by means of a brake that connects the ring gear firmly to the housing and on the other hand the flow of force is achieved by means of two opposing switchable free-wheeling mechanisms which are switched contrary to each other, so that depending on the blocking switching of one of the two free-wheeling mechanisms the rotor can overrun the crankshaft or the crankshaft can overrun the rotor. In this way, with transmission ratio reduction the idle combustion engine can be started, and with the same transmission ratio it can be operated with torque support from the starter-generator (boost mode). Furthermore, the starter-generator can be driven as a generator by the combustion engine at both transmission ratios. Moreover, it can provide stationary air conditioning of the motor vehicle with the combustion engine not running, by driving an ancillary unit provided as an air conditioner compressor by the starter-generator, preferably without a transmission ratio change, with the crankshaft over-run.

In this case, it is difficult to control the brake that shifts the transmission ratios, and must take place precisely in order to avoid jerky changes in torque that can result in material wear and loss of comfort.

BRIEF SUMMARY OF THE INVENTION

The object of the invention is therefore a method for controlling the belt drive wherein the brake can be switched in an improved manner.

The object is fulfilled by a method for controlling a belt drive of a drivetrain of a motor vehicle, with a planetary gear set which shifts a transmission ratio between a starter-generator and a combustion engine, the planetary gear set having a ring gear which can be connected fixedly with respect to a housing by a brake, a web which is connected to a crankshaft of the combustion engine of the drivetrain, having planet gears arranged around the circumference, and a sun gear which is connected in a rotationally fixed connection to a rotor of the starter-generator and to at least one ancillary unit, as well as having a first switchable free-wheeling mechanism which blocks in the direction of torque from the rotor to the crankshaft and having a second switchable free-wheeling mechanism which blocks in the direction of torque from the crankshaft to the rotor, a characteristic curve of the torque that is transmissible through the brake being adapted over its actuation path. In order to improve the switching precision of the brake and thereby prevent high torque loads when engaging the brake, a characteristic curve of the torque transmissible through the brake is adapted over its actuation path. Through the use of such a characteristic curve, the torque behavior of the brake over the actuation path is set, and can be adapted continuously. This enables reliable application of the actuator that engages and disengages the brake along the actuation path. It has turned out here that the shape of the characteristic curve can be specified, for example, algorithmically or empirically by means of corresponding characteristics, and on the basis of one or more control points that can be adjusted to the currently existing operating behavior of the brake. For example, the characteristic curve can be adapted by changing the coefficient of friction and the contact point at which the brake begins to transmit torque. Regular adjustment of the contact point, in particular, is of especially great benefit here.

The adaptation of the contact point may be carried out in a plurality of, preferably all operating conditions of the starter-generator, so as to be able to undertake regular adaptations. In one advantageous method, the characteristic curve can occur with the first free-wheeling mechanism switched to blocking. In this case, the contact point is ascertained through position-controlled engaging of the brake while analyzing operating data of the starter-generator. This means that while the brake is being engaged, at the beginning of the transmission of torque, the behavior of the starter-generator is evaluated, and the contact point of the brake is thereby detected, stored as an adaptation value, and used for adapting the characteristic curve until the next contact point determination.

The determination of the contact point with the first free-wheeling mechanism blocking can be carried out with the crankshaft of the combustion engine standing still, by operating the starter-generator under constant conditions while the brake is being engaged, at least until determination of the contact point by reaction of the starter-generator. It has proven to be especially advantageous to operate an air conditioner compressor when the combustion engine is at a stop and the rotor of the starter-generator is turning, overrunning the crankshaft. Nevertheless, with appropriate attention to the load of the air conditioner compressor, which can be predicted or estimated, for example, through an analysis of performance, and with compensation for its effect on the starter-generator in this operating state of stationary air conditioning of the motor vehicle, the contact point can be ascertained with sufficient accuracy. Alternatively, when fluctuation of the load of the air conditioner compressor is detected or estimated, a planned contact point determination can be briefly halted or omitted.

Furthermore, the contact point can occur in generator mode with the brake disengaged, by engaging the latter—as before—at low speed, in which case the starter-generator is preferably operated under speed regulation at a target speed just above the speed of the crankshaft, and the operating data of the starter-generator are analyzed to ascertain the contact point. A load of ancillary units, in particular, an air conditioner compressor, can be determined and compensated for as already described.

When the brake is engaged, the coefficient of friction can be ascertained through position-controlled disengaging of the brake with the starter-generator switched under maximum load, equalized speeds of rotor and crankshaft and allowance for the torque components necessary for changes in the kinetic energy, while analyzing operating data of the starter-generator and possibly taking into account a load of the at least one ancillary unit. At the same time, a load of the generator can be set to the maximum, allowance can be made for a load of the air conditioner compressor, and the speeds of the rotor and the crankshaft preferably coordinated with each other, so that the torque proportions that contribute to a change of the kinetic energy can be ascertained and compensated for. The analysis of the operating data of the starter-generator obtained under these circumstances can be drawn upon with sufficient precision to ascertain the coefficient of friction.

For example, in an impulse start with starter-generator rotating and air conditioner compressor driven, with the second free-wheeling mechanism switched to blocking, the brake can be engaged and, while, for example, the operating data such as gradients of the speed of the starter-generator are monitored and according to the currently obtained torques, the coefficient of friction can be matched to the characteristic curve and the motion equations of the starter-generator. The load of the air conditioner compressor can be taken into account in this case. After the brake has reached a non-slip condition, it can be further engaged by the amount of a specified portion of the actuation travel in order to avoid a slipping condition.

The operating data of the starter-generator may be, for example, a speed of rotation of the rotor and/or a torque present at the rotor, and/or gradients of these.

It should be understood that the invention includes a drivetrain of a motor vehicle with a belt drive, which contains a planetary gear set that shifts a transmission ratio between a starter-generator and a combustion engine, the planetary gear set having a ring gear which can be connected fixedly with respect to a housing by a brake, a web which is connected to a crankshaft of the combustion engine of the drivetrain, having planet gears arranged around the circumference, and a sun gear which is connected in a rotationally fixed connection to a rotor of the starter-generator and to at least one ancillary unit, as well as having a first switchable free-wheeling mechanism which blocks in the direction of torque from the rotor to the crankshaft and having a second switchable free-wheeling mechanism which blocks in the direction of torque from the crankshaft to the rotor, and which is controlled by the proposed method.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
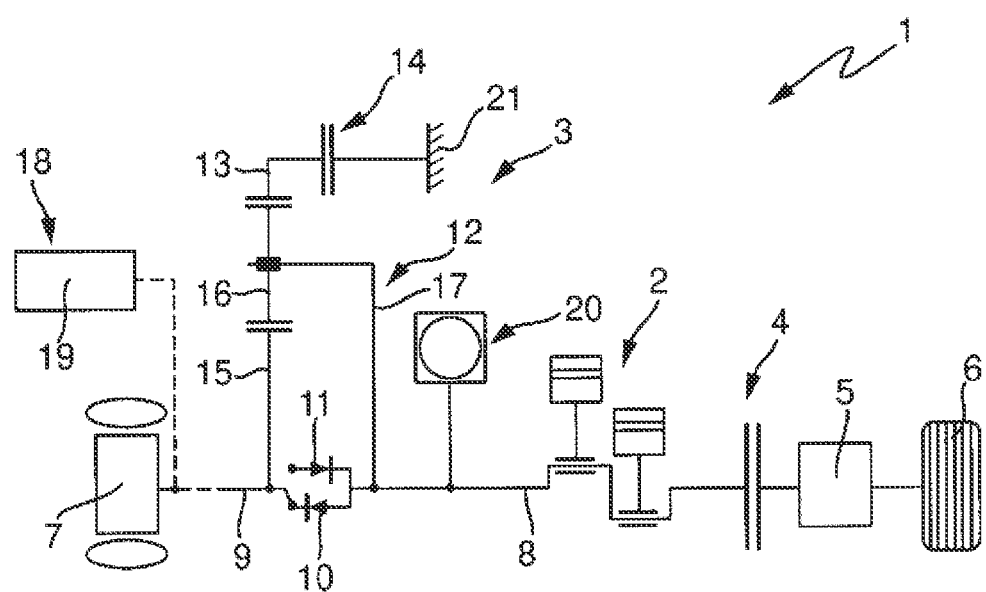
FIG. 1 is a schematic depiction of a drivetrain of a motor vehicle having a belt drive.

Adverting to the Figures, FIG. 1 shows a schematic depiction of drivetrain 1 of a motor vehicle with combustion engine 2, belt drive 3, friction clutch 4, gear unit 5 and driving wheel 6.

The combustion engine drives with crankshaft 8 both gear unit 5, which may be designed as a shift transmission, automated shift transmission, dual-clutch transmission and the like, and belt drive 3. Belt drive 3 contains starter-generator 7, whose rotor 9 is connectible in a rotationally fixed connection, for example, coaxially or by means of pulleys and belts—not shown—to crankshaft 8 of the combustion engine, by means of counter-operative free-wheeling mechanisms 10, 11, which are switched by means of an actuator, which is not shown. Here, first free-wheeling mechanism 10 activates the flow of torque from crankshaft 8 to rotor 9 and blocks in the opposite direction, while second free-wheeling mechanism 11 enables the flow of torque from rotor 9 to crankshaft 8 and blocks it in the opposite direction. Free-wheeling mechanisms 10, 11 are activated alternatively. Furthermore, connected between rotor 9 and crankshaft 8 is planetary gear set 12, whose ring gear 13 can be connected fixedly with respect to a housing, for example, engine housing 21 of combustion engine 2, by means of brake 14. Sun gear 15 is connected to rotor 9 in a rotationally fixed connection. Planet gears 16 which mesh between ring gear 13 and sun gear 15 are accommodated on web 17. Web 17 is connected to crankshaft 8 in a rotationally fixed connection.

Furthermore, at least one ancillary unit 18 is connected to rotor 9 in a rotationally fixed connection, for example, linked into the belt of belt drive 3 by means of a pulley. In the exemplary embodiment shown, ancillary unit 18 is formed by air conditioner compressor 19, which is connected to rotor 9 in a rotationally fixed connection with a fixed transmission ratio change or no change.

Assigned to crankshaft 8 in a rotationally fixed connection is pulley damper 20, which can be designed as an absorber and/or damper.

Appropriate operating conditions of drivetrain 1 are controlled by operating free-wheeling mechanisms 10, 11 and brake 14 accordingly by means of the actuators—not shown—or a single actuator which controls all actuating functions. In this case, brake 14 controls the transmission ratio of planetary gear set 12, and the free-wheeling mechanisms control the flows of torque between rotor 9 and crankshaft 8. Depending on the operating condition of combustion engine 2 and of starter-generator 7, a plurality of advantageous operating conditions of drivetrain 1 result, which will be considered in detail in FIGS. 2 through 6. When setting the operating conditions, brake 14 has a decisive function in the load switching function of planetary gear set 12. To avoid jerky distributions of torque between the two gear steps of planetary gear set 12, brake 14 is operated over an actuation path from completely transmitted torque, i.e., a state which connects ring gear 13 fixedly without slippage with respect to the housing, to free rotatability of ring gear 13, depending on a stored characteristic curve. This characteristic curve reproduces the connection between actuation path and torque transmitted via brake 14, and is adaptable by ascertaining the contact point at whose actuation position brake 14 just begins to transmit torque. Advantageous contact point adaptations which are dependent on the operating conditions will be explained below.

Figure 2:
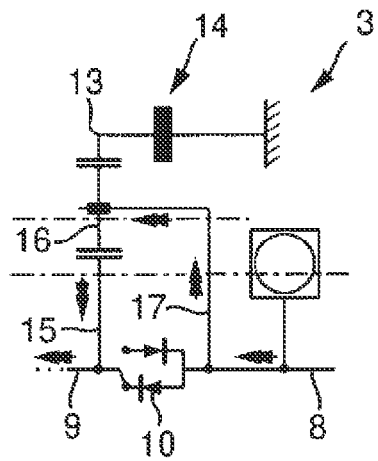
FIG. 2 is a schematic depiction of the belt drive as shown in FIG. 1 in reduced-transmission-ratio generator mode.

FIG. 2 shows belt drive 3 in generator mode with brake 14 engaged and first free-wheeling mechanism 10 activated. Rotating crankshaft 8 transmits torque to web 17. Braked ring gear 13, fixed with respect to the housing, causes a flow of torque through planet gears 16 and sun gear 15 with speed translation, for example, at a transmission ratio of 3:1. This yields a greater speed of rotor 9, and thus better efficiency of the starter-generator, in particular at low speeds of crankshaft 8.

Starting from this operating condition, a friction coefficient adaptation is carried out according to the following procedural steps:

high to maximum setting of the load of the starter-generator, possibly with speed regulation of the starter-generator, in order to avoid high energy inputs;

position-controlled disengagement of brake 14 over the actuation path;

adjustment of the coupling of the speeds of rotor 9 and crankshaft 8; and, analysis of the torques of the starter-generator and determination of the coefficient of friction with corresponding reaction of the torque during disengagement of brake 14, giving consideration to the proportions of torque due to changing the kinetic energy and the load of the air conditioner compressor.

Figure 3:
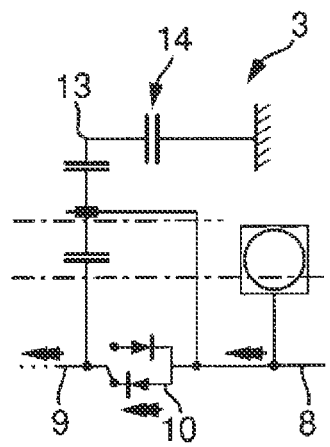
FIG. 3 is a schematic depiction of the belt drive as shown in FIG. 1 in unchanged-transmission-ratio generator mode.

FIG. 3 shows belt drive 3 in generator mode with brake 14 disengaged and first free-wheeling mechanism 10 activated. Freely rotating ring gear 13 causes non-translated transmission of the torque from crankshaft 8 to rotor 9 at a ratio of 1:1, through first free-wheeling mechanism 10.

Starting from this operating condition, a contact point adaptation is carried out according to the following procedural steps:

operation of the starter-generator under speed regulation, with a preferred target speed for rotor 9 of just over the speed of crankshaft 8;

position-controlled engagement of brake 14 over the actuation path; and, analysis of the torque of the starter-generator and/or of the speed of rotor 9, and determination of the contact point with corresponding reaction of the torque, at the beginning of transmission of torque through brake 14, giving consideration to the load of the air conditioner compressor.

Figure 4:
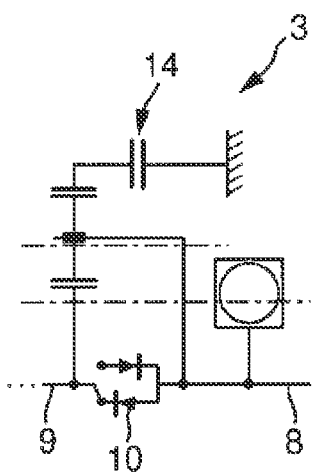
FIG. 4 is a schematic depiction of the belt drive as shown in FIG. 1 showing the combustion engine turned off and with stationary air conditioning.

FIG. 4 shows belt drive 3 with the combustion engine shut off, with crankshaft 8 standing still, with brake 14 disengaged and first free-wheeling mechanism 10 activated. The starter-generator is operated to drive air conditioner compressor 19 (FIG. 1) for stationary air conditioning of the motor vehicle; rotor 9 overruns crankshaft 8.

Starting from this operating condition, a contact point adaptation is carried out according to the following procedural steps:

position-controlled engagement of brake 14 over the actuation path; and, analysis of the torque of the starter-generator and/or of the speed of rotor 9, and determination of the contact point with corresponding reaction of belt drive 3 as a result of the torque transmitted through brake 14, giving consideration to the load of the air conditioner compressor.

With the stationary air conditioning turned off, in contrast to previous procedural steps the starter-generator is also idle. In order to carry out an adaptation of the contact point in this operating state, the following procedural steps are performed, modifying the previous procedural steps.

switching over to generator mode, possibly with disengagement of brake 14;

speed regulation of the starter-generator, for example, to 300 revolutions per minute (rpm);

position-controlled engagement of brake 14 over the actuation path; and, analysis of the torque of the starter-generator and/or of the speed of rotor 9, and determination of the contact point with corresponding reaction of the torque, at the beginning of transmission of torque through brake 14, giving consideration to the load of the air conditioner compressor.

Figure 5:
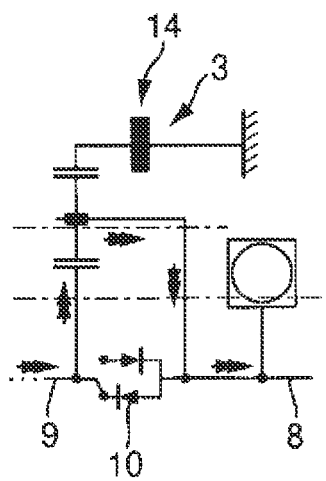
FIG. 5 is a schematic depiction of the belt drive as shown in FIG. 1 when starting the combustion engine; and, FIG. 6 is a schematic depiction of the belt drive as shown in FIG. 1 showing the combustion engine supported by the starter-generator.

FIG. 5 shows belt drive 3 in the operating state of an impulse start of the combustion engine by the starter-generator, with brake 14 engaged and first free-wheeling mechanism 10 activated. The rotor rotates in this case at the greater speed of transmission ratio 3:1 compared to crankshaft 8 and pulls the latter with it while brake 14 is engaging, whereby the combustion engine is started.

Starting from this operating condition, an adaptation of the characteristic curve is carried out according to the following procedural steps:

position-controlled engagement of brake 14 over the actuation path, preferably rapid engagement in the flat range of the characteristic curve, retarded engagement after surpassing the stored contact point;

monitoring of the gradients such as torque gradient and/or speed gradient of the starter-generator, creation of an up-to-date characteristic curve, in particular contact point from the monitored gradients from the stored characteristic curve and a motion equation over the actuation path, giving consideration to the load of the air conditioner compressor;

possibly dependent on the starting process, retarded engagement or halting of the process of engaging brake 14; and, engagement of brake 14 after a slipping process of brake 14 has ended.

Figure 6:
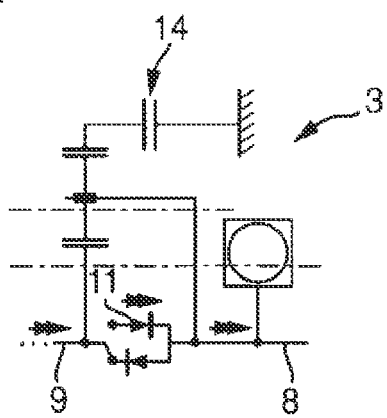

FIG. 6 shows belt drive 3 in the operating state of the starter-generator supporting the internal combustion engine (boost mode), with brake 14 disengaged and second free-wheeling mechanism 11 engaged. Rotor 9 transmits torque to crankshaft 8 without a change of transmission ratio, and supports the latter in driving the motor vehicle.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS 1 drivetrain
2 combustion engine
3 belt drive
4 friction clutch
5 gear unit
6 driving wheel
7 starter-generator
8 crankshaft
9 rotor
10 free wheeling mechanism
11 free wheeling mechanism
12 planetary gear set
13 ring gear
14 brake
15 sun gear
16 planet gear
17 web
18 ancillary unit
19 air conditioner compressor
20 pulley damper
21 engine housing

What is claimed is:

1. A method for controlling a belt drive of a drivetrain of a motor vehicle, said belt drive comprising:
   a planetary gear set which shifts a transmission ratio between a starter-generator and a combustion engine, said planetary gear set having a ring gear which can be connected fixedly with respect to a housing by means of a brake;
   a web which is connected to a crankshaft of the combustion engine of the drivetrain, having planet gears arranged around the circumference;
   a sun gear which is connected in a rotationally fixed connection to a rotor of the starter-generator and to at least one ancillary unit; and,
   a first switchable free-wheeling mechanism and a second switchable free-wheeling mechanism,
   wherein said method for controlling said belt drive comprises the following steps:
     blocking by said first switchable free-wheeling mechanism in the direction of torque from said rotor to said crankshaft; and,
     blocking by said second switchable free-wheeling mechanism in the direction of torque from said crankshaft to said rotor, wherein a characteristic curve of the torque that is transmissible through said brake is adapted over its actuation path.

2. The method recited in claim 1, wherein said characteristic curve is adapted on the basis of a determination of a contact point, a coefficient of friction of said brake, or said contact point and said coefficient of friction of said brake.

3. The method recited in claim 2, wherein an adaptation of said characteristic curve occurs during operation of an ancillary unit, with consideration being given to a load of said ancillary unit during said adaptation while analyzing operating data of said starter-generator.

4. The method recited in claim 2, wherein an adaptation of said characteristic curve occurs during operation of an air conditioner compressor, with consideration being given to a load of said air conditioner compressor during said adaptation while analyzing operating data of said starter-generator.

5. The method recited in claim 2, wherein with said second free-wheeling mechanism switched to blocking, said brake is engaged with different engagement speeds up to a specified position along said characteristic curve, and after a non-slipping state of said brake is reached the latter is engaged further by a specified portion of said actuation path.

6. The method recited in claim 1, wherein an adaptation of said characteristic curve occurs with said first free-wheeling mechanism switched to blocking.

7. The method recited in claim 6, wherein said adaptation of said characteristic curve is obtained through position-controlled engagement of said brake while analyzing operating data of said starter-generator.

8. The method recited in claim 6, wherein said adaptation of said characteristic curve occurs with said crankshaft of said combustion engine standing still.

9. The method recited in claim 6, wherein said adaptation of said characteristic curve occurs with said crankshaft rotating and said starter-generator driven by the latter.

10. The method recited in claim 6, wherein said characteristic curve can be ascertained through position-controlled disengaging of said brake with said starter-generator switched under maximum load, equalized speeds of rotor and crankshaft and allowance for the torque components necessary for changes in the kinetic energy, while analyzing operating data of said starter-generator.

11. The method recited in claim 6, wherein said characteristic curve can be ascertained through position-controlled disengaging of said brake with said starter-generator switched under maximum load, equalized speeds of rotor and crankshaft and allowance for the torque components necessary for changes in the kinetic energy, while analyzing operating data of said starter-generator, and taking into account a load of at least one ancillary unit.

12. The method recited in claim 6, wherein operating data of said starter-generator include a speed of rotation of said rotor, a torque present at said rotor, or both said speed of rotation of and said torque present at said rotor.

13. The method recited in claim 12, wherein said operating data include gradients of said speed of rotation of said rotor, said torque present at said rotor, or both said speed of rotation of and said torque present at said rotor.

* * * * *